Aug. 26, 1930.    W. HERTEL JR    1,774,140
KNOCKDOWN PLATFORM
Filed Jan. 23, 1928
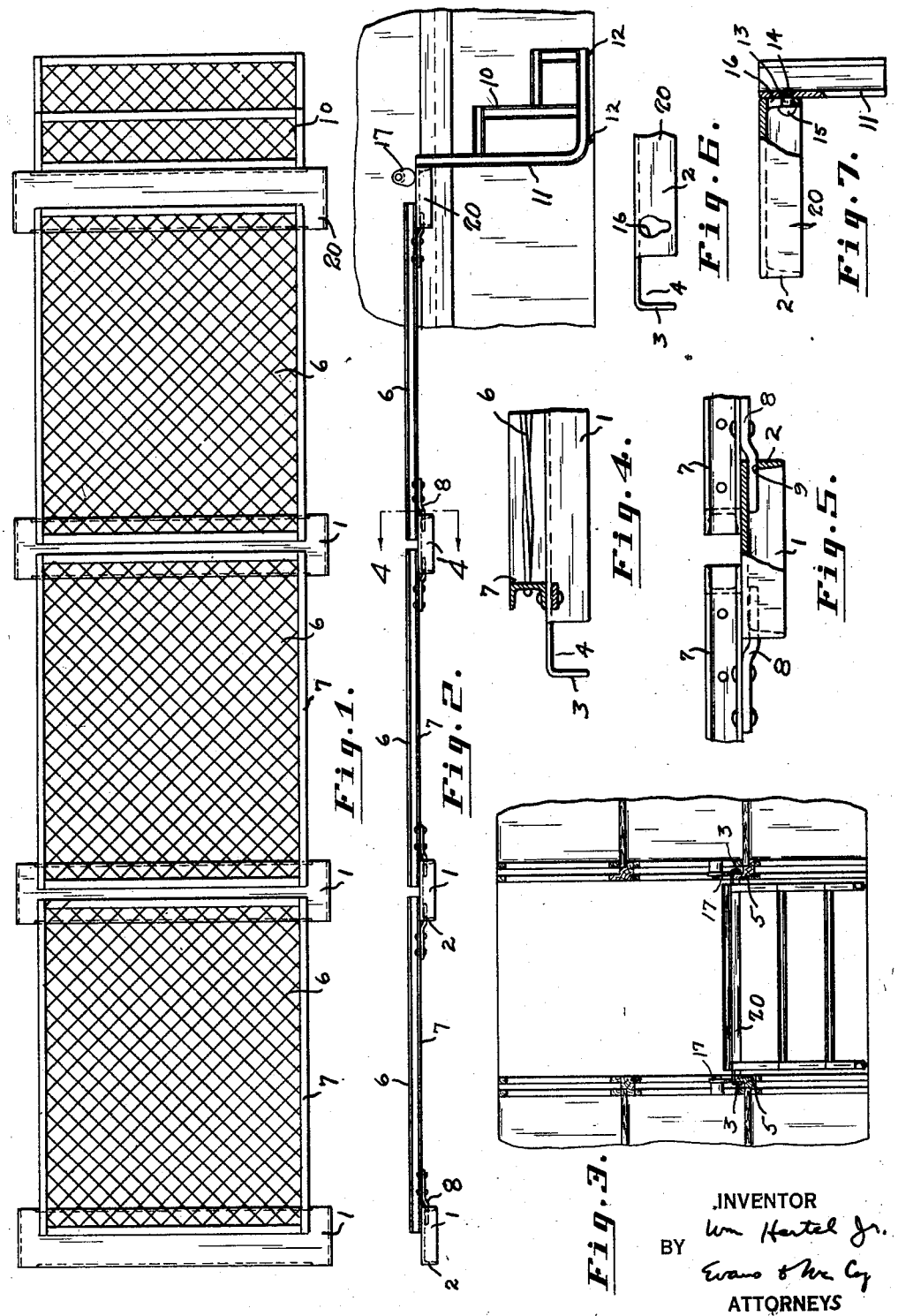
INVENTOR
Wm Hertel Jr.
BY
Evans & McCoy
ATTORNEYS Patented Aug. 26, 1930

1,774,140

UNITED STATES PATENT OFFICE

WILLIAM HERTEL, JR., OF VAN WERT, OHIO

KNOCKDOWN PLATFORM

Application filed January 23, 1928. Serial No. 248,889.

This invention relates to knockdown platforms or runways for use in poultry cars and has for its object to provide a platform of light weight but ample strength which provides convenient access to upper batteries of poultry cages, which can be very rapidly set up and taken down and which can be stored in a small space when not in use.

Poultry cars are ordinarily provided with cages arranged in tiers extending along the sides and ends of the car and when poultry is being shipped in the cars, it is necessary for attendants to feed and water the poultry at regular intervals during their travel. To obtain access to the top batteries of cages, the attendant must ordinarily stand on a step ladder, stool, box or the like in order to gain access to the uppermost cages. This is more or less dangerous when the cars are in motion or while the cars are being switched about in freight yards, since sudden application of brakes or bumping of the cars is apt to cause the attendant to fall and suffer painful bruises, if not serious injury.

The present invention aims to provide a simple and inexpensive knockdown platform which may be quickly set up between the cages to enable an attendant to feed and water the poultry in the upper cages or to load and unload poultry from the upper cages in much less time and with greater safety than heretofore possible.

Further objects are to provide a platform structure adapted to be supported on the lower rows of cages, to provide means for securely holding the platform in place and to provide interfitting the connections between adjacent platform sections and supporting members which permit assembly of the structure with a minimum of labor.

With the above and other objects in view, the invention may be said to comprise the structure as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Figure 1 is a top plan view of the assembled platform.

Fig. 2 is a side elevation of the assembled platform.

Fig. 3 is a vertical section showing the platform mounted between the cages on opposite sides of a poultry car.

Fig. 4 is a section taken on the line indicated at 4—4 in Fig. 2.

Fig. 5 is a detail view showing the connection between a supporting cross bar and adjoining floor panels.

Fig. 6 is a fragmentary side elevation of the cross bar to which the steps are attached.

Fig. 7 is a detail view showing the connection between the steps and cross bar.

Referring to the accompanying drawings, the knockdown platform of the present invention is supported from the cages on the opposite sides of the poultry car by means of supporting cross bars 1 and an end cross bar 20, which are formed of sheet steel and are of channel form with depending side flanges 2 and downturned end flanges 3, which are spaced from the ends of the flanges 2 to provide notches 4 at the end of the bar to hook over the longitudinally extending frame members 5 extending along the tops of the cages of the lowermost row at opposite sides of the car, the frame members 5 of the cages forming the top and bottom door frame members of the cages. The spaces between successive supporting cross bars 1 are bridged by floor panels 6 formed of wire mesh secured in rectangular steel frames 7 formed of channel bars. The opposite ends of the floor panels 6 rest upon the tops of the supporting cross bars 1 and are held in proper position on the cross bars by spacing clips 8, which are welded, riveted or otherwise rigidly secured to the under sides of the side bars of the frame 7 adjacent the opposite ends thereof. The outer ends of the clips 8 are offset downwardly from the bottom of the frame 7 and the free ends of the spring clips are adapted to be inserted through rectangular openings 9 in the flanges 2 of the supporting bars. As shown in the drawings, the rectangular openings 9 are formed in both flanges 2 of the supporting bars 1 and in the outermost flanges of the end cross bar 20 for reasons that will be apparent. In assembling the platform, a cross bar 1 is placed upon the frame members 5 above the doors of the lower cages at the end of the car, the end of a panel 6 is placed on the end cross bar and pushed toward the bar to cause its clips 8 to enter the openings 9 in the flange of the cross bar, a second cross bar is then slipped under the outer end of the panel and engaged with the spacing clips 8 at the outer end of the panel. A second panel is then secured in place on the second cross bar and these operations are repeated until the desired length of platform has been set up. The tiers of cages ordinarily extend from the ends of the car to the center doors and three panels will ordinarily provide a platform of sufficient length for one end of the car.

To adequately support the forward end of the platform and to provide convenient means for mounting the platform, steps 10 secured to L shaped frame members 11 form a step ladder which is attached to the forward end of the platform. The frame members 11 are preferably provided on the lower ends thereof with anchoring points 12 which dig into the floor of the car and prevent sliding movement of the step frame on the car floor. For detachably securing the step frame to the end cross bar of the platform, the frame members 11 are provided adjacent their upper ends with bolts 13, which have reduced threaded portions 14 secured into the frame members and with heads 15 which are adapted to enter and lock in keyhole slots 16 formed in the outer side flange of the end cross bar 20. The length of the enlarged portions of the bolts 13 between the heads 15 and reduced threaded portions 14 is sufficient to accommodate the thickness of the supporting bar flange so that the step frame may be quickly secured to the cross bar by inserting the bolt heads 15 through the enlarged portions of the slots 16 and allowing the bolts to drop into the reduced portions of the slots. After the platform has been assembled, it may be securely locked against any endwise movement which might disconnect the floor panels from the supporting cross bars by means of clamping cams 17 of oval shape which are rotatably mounted upon front portions of the cages on opposite sides of the car and which are adapted to be rotated into clamping engagement with the ends of the cross bar 20 to which the stepladder is attached to clamp the cross bar to the frame members 5 upon which it is supported.

The steps 10 as well as the panels 6 are preferably formed of wire mesh in order that the structure may be made as light as possible and yet possess the necessary strength. The platform structure can be set up very quickly at the time of day when it is desired to feed and water the poultry in the upper cages or when the car is to be loaded or unloaded, and when not in use, it may be stored in a very small space. All of the parts of the platform are exceedingly light and no labor other than that of putting the parts in place and slipping them into engagement one with the other is required in setting up the platform.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A knockdown platform structure for poultry cars comprising a series of cross supports in the form of channel bars having downturned end portions adapted to hook over portions of the cage structures on opposite sides of the car, removable floor panels bridging the spaces between cross bars and resting at opposite ends on said cross bars, said panels each comprising a rectangular steel frame and a wire mesh supported by said frame, spacing clips attached to the side bars of the frame adjacent the ends thereof and projecting through openings in the flanges of the channel bars, and a step ladder detachably secured to an end cross bar.

2. A knockdown platform structure for poultry cars comprising a series of cross supports in the form of channel bars having downturned end portions adapted to hook over portions of the cage structures of cages on opposite sides of the car, removable floor panels bridging the spaces between cross bars and resting at opposite ends on said cross bars, said panels each comprising a rectangular steel frame and a wire mesh supported by said frame, spacing clips attached to the side bars of the frame adjacent the ends thereof and projecting through openings in the flanges of the channel bars, clamping members carried by the cages and engageable with a cross bar for securing the platform against endwise movement, and a step ladder detachably secured to one end of the platform.

In testimony whereof I affix my signature.

WILLIAM HERTEL, Jr.